United States Patent [19]

Kerschner et al.

[11] Patent Number: 4,700,018

[45] Date of Patent: Oct. 13, 1987

[54] METHOD AND CIRCUIT ARRANGEMENT FOR THE TRANSMISSION OF DATA SIGNALS BETWEEN TWO CONTROL DEVICES BELONGING TO A LOOP SYSTEM

[75] Inventors: Gunther Kerschner, Munich; Karl-Heinz Michels-Krohn, Martinsried, both of Fed. Rep. of Germany; Josef Untergruber, deceased, late of Nubdrof/Inn, Fed. Rep. of Germany, by Angela Untergruber, legal representative

[73] Assignee: Siemens Aktiengesellschaft, Berlin & Munich, Fed. Rep. of Germany

[21] Appl. No.: 900,900

[22] Filed: Aug. 27, 1986

[30] Foreign Application Priority Data

Sep. 11, 1985 [DE] Fed. Rep. of Germany ....... 3532460

[51] Int. Cl.<sup>4</sup> ...................... H04L 11/16; H04L 25/02
[52] U.S. Cl. ..................................... 178/2 C; 178/2 D
[58] Field of Search ................. 178/2 D, 79, 113, 2 B, 178/2 C, 2 R, 2 E

[56] References Cited

U.S. PATENT DOCUMENTS 4,049,906  9/1977  Hafner et al. ...................... 178/2 C

FOREIGN PATENT DOCUMENTS 3136586  3/1983  Fed. Rep. of Germany.
3136495  3/1983  Fed. Rep. of Germany.

OTHER PUBLICATIONS

"High Throughput Optical Fiber Loop Network with Effective Detection Mechanism of Lost or Duplicated Token," Yagyu et al, Pathways to the Information Society, Proceedings of the Sixth International Conference on Computer Communication, London, Sep. 7-10, 1982, pp. 496-501.

*Primary Examiner*—Stafford D. Schreyer
*Attorney, Agent, or Firm*—Hill, Van Santen, Steadman & Simpson

[57] ABSTRACT

A method and apparatus for transmitting data signals between two control devices connected to a loop transmission system are disclosed wherein data signals are transmitted in the form of signal blocks. In addition to the data signal, each signal block includes a receiver address having a block start identifier which precedes the data signals, and a sender address with a block end identifier following the data signals. In response to the appearance of the block start identifier and the receiver address, the signal block received by a control device is copied in the control device identified by the receiver address. The copying is undertaken for possible further processing. The signal block is then forwarded to the next control device via the loop, with the block start identifier cancelled. Before forwarding, an acknowledgement signal is attached to the sender address. The acknowledgement signal is recognized by the control device which sent the date signals.

Such recognition occurs in response to the appearance of both a block end identifier and the sender address. The sending control device then accepts the returned acknowledgement signal for evaluation thereof.

7 Claims, 8 Drawing Figures

```
    A E
  ┌─┬─┬─────────┐
  │1│0│  EADR   │
  ├─┼─┼─────────┤
  │0│0│  DS1    │
  ├─┼─┼─────────┤
  │ │ │   .     │
  │ │ │   .     │
  │ │ │   .     │
  ├─┼─┼─────────┤
  │0│0│  DSn    │
  ├─┼─┼─────────┤
  │0│1│  SADR   │
  ├─┼─┼─────────┤
  │0│0│  LQ     │
  └─┴─┴─────────┘
```

FIG 5a

| A | E | | |
|---|---|---|---|
| 1 | 0 | EADR | |
| 0 | 0 | DS1 | |
| | | ⋮ | |
| 0 | 0 | DSn | |
| 0 | 1 | SADR | |
| 0 | 0 | LQ | |

FIG 5b

| A | E | | |
|---|---|---|---|
| 0 | 0 | EADR | |
| 0 | 0 | DS1 | |
| | | ⋮ | |
| 0 | 0 | DSn | |
| 0 | 1 | SADR | |
| 0 | 0 | EADR | QS |

FIG 5c

| A | E | | |
|---|---|---|---|
| 1 | 0 | EADR | |
| 0 | 0 | DS1 | |
| | | ⋮ | |
| 0 | 0 | DSn | |
| 0 | 0 | SADR | |
| 0 | 1 | EADR1 | QS1 |

FIG 5d

| A | E | | |
|---|---|---|---|
| 1 | 0 | EADR | |
| 0 | 0 | DS1 | |
| | | ⋮ | |
| 0 | 0 | DSn | |
| 0 | 0 | SADR | |
| 0 | 0 | EADR 1 | QS1 |
| 0 | 0 | EADR 2 | QS2 |
| | | ⋮ | |
| 0 | 1 | EADRm | QSm |

METHOD AND CIRCUIT ARRANGEMENT FOR THE TRANSMISSION OF DATA SIGNALS BETWEEN TWO CONTROL DEVICES BELONGING TO A LOOP SYSTEM

BACKGROUND OF THE INVENTION

1. Field of the Invention:

The invention relates to a method and to a circuit arrangement for the transmission of data signals between control devices connected to one another via a clock-controlled loop system operated directionally dependent.

2. Related Applications:

The present application is related to the following applications, all filed simultaneously herewith: Ser. No. 900,901 (Kerschner, Michels-Krohn, UnterGruber); Ser. No. 900,902 (Michels-Krohn, UnterGruber); Ser. No. 900,904 (Michels-Krohn, UnterGruber) and Ser. No. 900,908 (Michels-Krohn, UnterGruber).

3. Description of the Prior Art:

Data transmission systems are known wherein the control devices are control devices of a data switching system, whereby data signals to be output proceeding from a control device to a further control device are transmitted in sections from control device to control device in the form of a signal block together with a receiver address identifying a control device as the receiver which precedes the data signals. The signal block is characterized by a block start identifier, a sender address identifying the control device emitting the signal block as the transmitter which is attached to the data signals, and by a block end identifier. In response to the acceptance of a signal block, a control device selected as the receiver emits an acknowledgement signal together with the sender address for that control device from which the received signal block had been previously emitted.

A method is known wherein a signal block constructed as described above is transmitted proceeding from one control device of a loop system to a further control device in German OS No. 31 36 495. In the control device selected as the receiver, an acknowledgement information signal block is compiled in response to the reception of a signal block, this acknowledgement information signal block being subsequently transmitted to that control device from which the signal block just received had been previously emitted. The acknowledgement information signal block is thereby compiled in the same way as the previously received signal block, i.e., receiver address and sender address for the acknowledgement signal to be transmitted are attached to the actual acknowledgement signal. The two addresses for this purpose are derived from the signal block just received. A control outlay which is sometimes undesired is thus required in the individual control devices for the reception of signal blocks and the transmission of acknowledgement information signal blocks connected therewith.

SUMMARY OF THE INVENTION

An object of the present invention is to provide a method and circuit arrangement of the type described above, wherein signal blocks and acknowledgement signals can be transmitted between two control devices connected to the loop system with a low control circuitry outlay.

In accordance with the principles of the present invention, the above object is achieved in a method and system wherein, in response to the appearance of a signal block having a block start identifier and a receiver address, the signal block is copied in the receiving control device identified by the receiver address for possible processing. The receiving control device then cancels the block start identifier of the signal block, and attaches an acknowledgement signal to the sender address identified by the block end identifier. This modified signal block is then returned to the loop system and is transmitted around the loop back to the sending control device. The acknowledgement signal is recognized by the control device identified by the sender address, such recognition occurring due to the appearance of the block end identifier and the sender address. The sending control device then accepts the modified block signal for evaluation.

The method and apparatus disclosed herein have the advantage that the received signal block is directly employed for generating an acknowledgement signal intended for the sending control device. The block start identifier originally belonging to the signal block is cancelled, and an acknowledgement signal for the receiving control device is simply attached to the sender address already identified by the block end identifier. By cancelling the block start identifier, the forwarded signal block is no longer identified by other control devices as such. The sender address transmitted in conjunction with the block end identifier, however, is still recognizable. An acknowledgement signal confirming reception of the signal block is attached thereto by the receiving control device. The control device from which the signal block was originally sent, need only recognize the appearance of the sender address in combination with the block end identifier in order to accept the acknowledgement signal intended for that control device.

In one embodiment of the invention, the circuit includes a reception controller and a receiver having a reception memory for accepting signal blocks, and also includes an acknowledgement signal receiver. By separating the receiver arrangement into a reception memory and an acknowledgement signal receiver, it is possible to accept signal blocks and acknowledgement signals in the control device with a low circuit outlay, and to process these signals in components following the receiver arrangement. The reception memory may be, for example, a write/read memory controllable by two separate means for executing write/read events. By this expedient, the working speed of the control device can be adapted to the transmission rate of the loop system. For this purpose, it is preferable that the write/read memory be addressed in circulating fashion by counter arrangements. Given ciculating addressing of the write/read memory, to avoid overwriting signal blocks already stored in the write/read memory but not yet read out, a counter arrangement, may be provided which monitors the filling status of the write/read memory and, when a prescribed filling state is reached, aborts acceptance of the just-received signal block by inhibiting the counter which executes the write-in events.

The invention shall be set forth in greater detail below by way of example with reference to drawings.

DESCRIPTION OF THE DRAWINGS

FIGS. 5a through 5d show the structure of signal blocks which are transmitted via the loop system.

DESCRIPTION OF THE PREFERRED EMBODIMENTS

Figure 1:
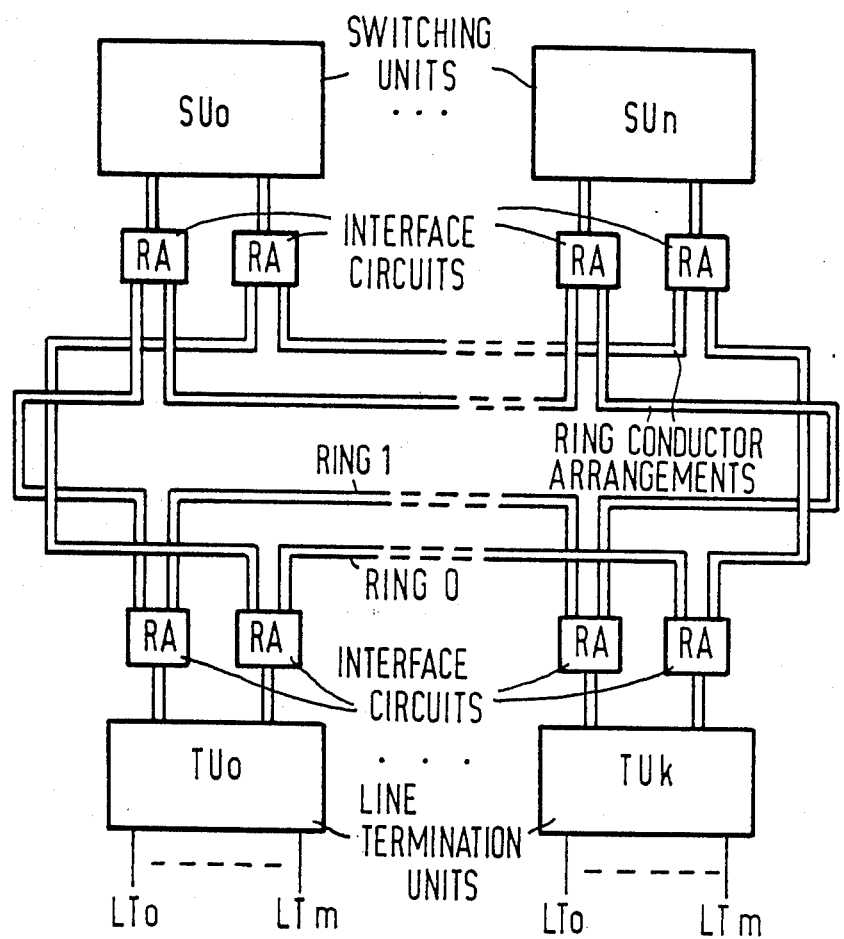
FIG. 1 shows a block circuit diagram of a data switching system formed of a loop system wherein the invention is applied.

FIG. 1 shows a data switching system including a plurality of switching units SUo through SUn. Based on the load division principle, these switching units execute the switching functions required for the transmission of data signals. For this purpose, the switching units are connected in common to a loop system. Such a loop system can be composed of a single, closed ring conductor arrangement. Such a loop system, however, as shown in FIG. 1 by way of example, can also be constructed of two mutually independent ring conductor arrangements RING0 and RING1 which proceed in parallel. For example, given outrage of one of the ring conductor arrangements, such a redundancy makes it possible to execute the transmission of signal blocks and acknowledgement signals on the respectively other ring conductor arrangement.

The connection of the said switching units SUo through SUn to the two ring conductor arrangements respectively ensues via a separate interface circuit RA for each of the ring conductor arrangements, this interface circuit RA to be discussed in greater detail below.

Line termination units TUo through TUk are also connected to the said ring conductor arrangements RING0 and RING1, being also respectively connected thereto via a separate interface circuit RA for each of the ring conductor arrangements. Together with the associated interface circuits, these line termination units serve for the data signal transmission between the said switching units and transmission lines connected to subscriber equipment, the transmission lines being connected to the line termination units TUo through TUk. Each of the line termination units has a plurality of line terminations LTo through LTm for such a connection of transmission lines.

The circuit units formed of the switching units or the line termination units and the associated interface circuits are also referred to below as control devices. If the loop system is composed of only a single ring conductor arrangement, only a single interface circuit belongs to a control unit.

Within the switching system shown in FIG. 1, i.e., between the switching units and the line termination units, the transmission of data signals ensues in the form of signal blocks which, as data signals in the course of the set-up of a connection, respectively comprise signaling information and, given an established connection, comprise the message signals to be transmitted between the subscriber equipment coming into consideration. In addition to the actual data signals which are respectively formed of a plurality of bits, for example 8 bits, each signal block to be transmitted contains a receiver address identifying at least one of the control devices as the receiver, a start identifier indicating the beginning of a signal block, an end identifier indicating the end of a signal block, a sender address identifying the control device emitting the signal block as the sender, and at least one acknowledgement signal or blank acknowledgement. A signal block constructed in such fashion, which shall be set forth in yet greater detail below, can thereby be emitted to one of the ring conductor arrangements only when the sending control device has previously received a transmit authorization signal transmitted from control device to control device which respectively drives the control device into a transmit authorization status.

Figure 2:
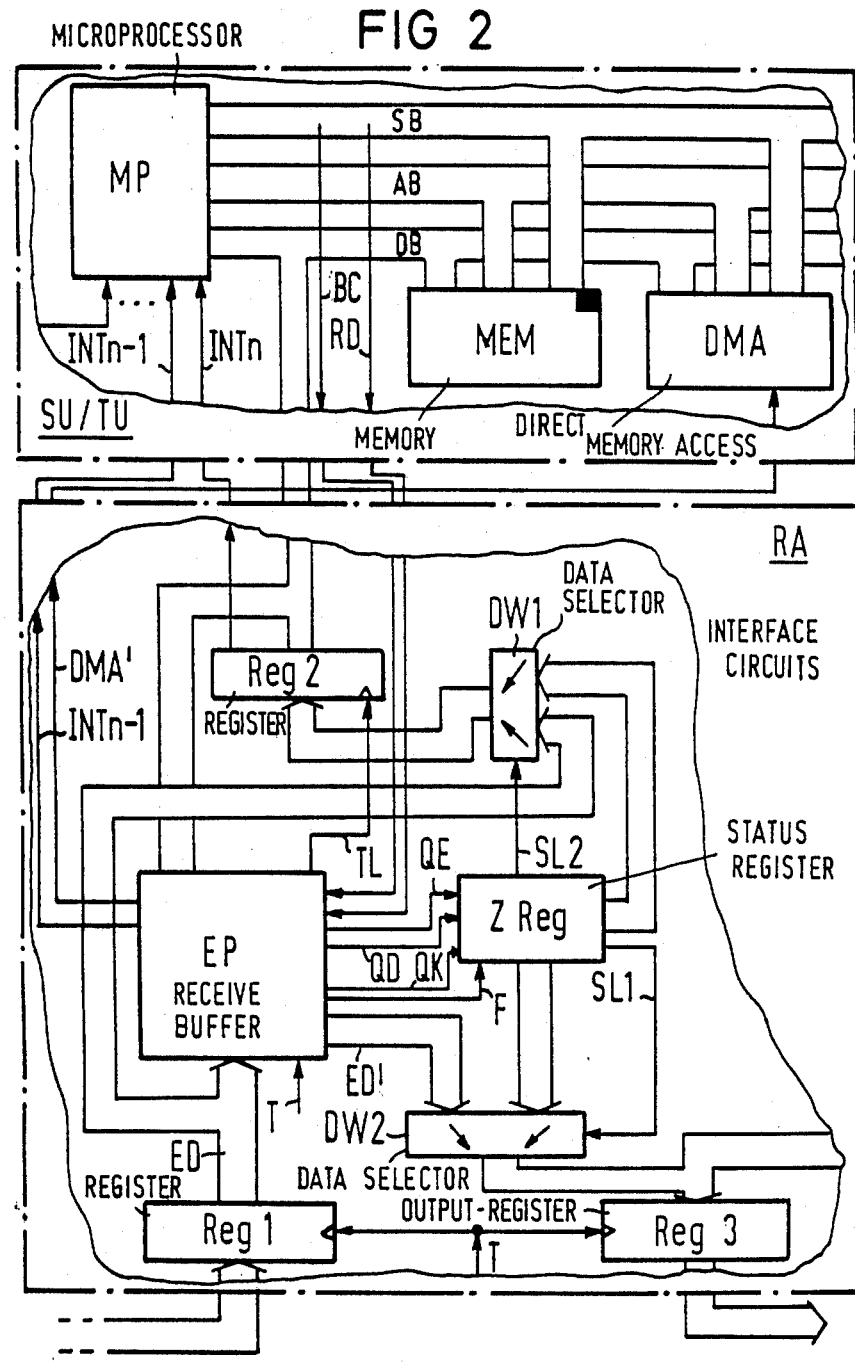
FIG. 2 shows a block circuit diagram of portions of the structure of one of the interface circuits schematically shown in FIG. 1 and of the structure of a switching unit or line termination unit connected thereto.

FIG. 2 shows the structure of a control device in greater detail. As mentioned above, such a control device is either composed of a switching unit or a line termination unit, indicated in FIG. 2 by the reference SU/TU, and of a plurality of interface circuits RA corresponding in number to the plurality of ring conductor arrangements. Only one of these interface circuits is shown in FIG. 2 since all interface circuits connected to the switching units or to the line termination units internally comprise the same structure.

The unit (switching unit or line termination unit) referenced SU/TU and shown in FIG. 2 includes a microprocessor arrangement which controls both transmit as well as receive events. Of this microprocesor arrangement, a microprocessor MP, a memory arrangement MEM comprising read-only memories (program memories) and write/read memories and a means for a direct memory access DMA are shown. The memory arrangement MEM and the direct memory access DMA are in communication with the microprocessor MP via a bus system. The bus system includes a data bus DB, an address bus AB, and a control bus SB. The interface circuit RA is also in communication with the microprocessor MP via the data bus DB and via the lines of the control bus referenced RD and BC. Further, two control lines referenced INTn-1 and INTn of the interface circuit lead to interrupt inputs INTn-1 and INTn of the microprocessor MP. The interface circuit RA is also connected to the means for a direct memory access DMA, via a further line referenced DMA.

An interface circuit RA includes devices for handling received signal blocks and acknowledgement signals as well as devices for the emission of signal blocks pending in the control device. In FIG. 2, only those devices for handling received signal blocks and acknowledgement signals which relate to the present invention are shown.

At the interface to the appertaining ring conductor arrangement which, for example, can be assumed to be the ring conductor arrangement RING0, the interface circuit RA shown in FIG. 2 has a receive register Reg1 which is supplied with signals transmitted via the ring conductor arrangement in parallel form. For this purpose, this register Reg1 is controlled from a clock generator which supplies clock signals corresponding to the transmission rate of the ring conductor arrangement to an input of the input register Reg1 via a line T. At its output side, this input register Reg1 is connected to a receive buffer arrangement EP via a line arrangement ED and to first inputs of a data selector DW1. As shall be set forth below, the receive buffer arrangement EP thereby serves for the acceptance of signal blocks and acknowledgement signals as well as for forwarding these to the control device following in the loop system.

The receive buffer arrangement EP is in communication with the unit SU/TU via the data bus DB, the aforementioned lines RD and BC of the control bus SB, and via the lines DMA and INTn-1. The receiver buffer arrangement is supplied with clock signals via the aforementioned line T and itself emits control signals to a status register ZReg via lines QE, QD, QK and F and to a clock input of a register Reg2 serving as acknowledgement receiver via a line TL. The receiver buffer arrangement EP is also in communication with first inputs of a further data selector DW2 via a line arrangement ED'.

Second inputs of the data selector DW2 and of the data selector DW1 are connected to outputs of the status register ZReg. Both data selectors are thereby controlled by the status register via the lines SL1 and SL2. At its output side, the data selector DW1 is connected to signal inputs of the register Reg2, which has its signal outputs connected to the data bus DB. By contrast, the output side of the data selector DW2 is connected to signal inputs of an output register Reg3. This register Reg3 is supplied with clock signals via the line T and emits signals supplied from the data selector DW2 at its signal outputs onto the ring conductor arrangement connected to the interface circuit RA. Moreover, the signal inputs of the output register Reg3 are also in communication with devices for the emission of signal blocks ready in the control device. However, as already set forth, the structure of these devices shall not be discussed in greater detail.

The interaction of the circuit parts shown in FIG. 2 in the acceptance and forwarding of signal blocks and acknowledgement signals will be set forth before the structure of the receiver buffer arrangement EP is discussed in greater detail.

Within the loop system, data signals can be optionally transmitted to a single control device selected as receiver or to a group of control devices. It shall be assumed first that data signals from a control device of the loop system are only to be transmitted to a single control device. For this transmission, the control device from which the data signals are to be emitted compiles the data signals in the unit SU/TU to form a signal block. Such a signal block is schematically shown in FIG. 5a. It is introduced by a receiver address EADR identifying the control device selected as the receiver. This receiver address is followed by the data signals DS1 through DSn to be transmitted. A sender address SADR identifying the control device sending this signal block is attached to these data signals. Finally, the signal block is terminated by a blank acknowledgement LQ prepared by the sender. Among other things, two identifier bits are respectively attached to the signals of a signal block. A first identifier bit (column A in FIGS. 5a through 5d) serves for identifying the start of a signal block. In a corresponding way, a second identifier bit (column E) serves for the identification of the end of a signal block. The start and the end of a signal block may be indicated, for example, by the logic status "1" of the respective identifier bit. The logic status "1" of the identifier bit A shall be referred to below as the block start identifier and the logic status "1" of the identifier bit E shall be referred to as the block end identifier. As shown in FIG. 5a, the block start identifier is transmitted together with the receiver address as a first entry and the block end identifier is transmitted together with the sender address as a last entry.

Upon arrival of a transmit authorization signal transmitted from control device to control device and respectively successively driving the control devices into a transmit authorization status, a signal block compiled in the way just described is subsequently emitted by the unit SU/TU (FIG. 2) to the ring conductor arrangement connected to the interface circuit RA, via the output register Reg3. Every one of the interface circuits connected to the ring conductor arrangement accepts the signals belonging to the transmitted signal block via its input register Reg1. With the assistance of the receive buffer arrangement EP belonging to the respective control device, a comparison of the receiver address transmitted in the signal block together with the block start identifier to the address assigned to the respective control device within the loop system is first executed. If the comparison does not yield a coincidence of the addresses compared to one another, the receive buffer arrangement EP forwards the received signal block via the line arrangement ED' to the data selector DW2 unmodified. Via the data selection DW2 and the output register Reg3, the signal block then again arrives onto the ring conductor arrangement.

If, however, the address comparison yields a coincidence of the addresses compared to one another, the signal block just received is copied in the receive buffer arrangement EP. The block start identifier is cancelled, and the signal block itself is forwarded via the line arrangement ED' to the control device following in the loop system. Given this forwarding, the status register ZReg attaches another acknowledgement signal EADR, QS to the sender address SADR, so that the blank acknowledgement (LQ) originally contained in the signal block is overwritten. For this attachment, the status register ZReg is supplied with a control signal via the line QE, from the receive buffer arrangement EP which monitors the appearance of the block end identifier E and of the sender address SADR. The forward signal block is shown in FIG. 5b.

After the copying of a signal block, the receive buffer arrangement EP emits a control signal indicating the readiness of a received signal block, via the line DMA' to the means for a direct memory access DMA. The direct memory access DMA then effects transfer of the signal block into the unit SU/TU. The microprocessor MP is informed of the end of the signal block by a interrupt signal at its interrupt input INTn-1, from the receive buffer arrangement EP.

Since the block start identifier A originally transmitted in the signal block is erased in the forwarding thereof, the signal block is no longer perceived as such, so that it cannot be accepted by the following control devices. Only the sender address SADR transmitted together with the block end identifier E can still be perceived as such. The appearance of block end identifier and sender address is monitored in the control device from which the just-acknowledged signal block had been previously emitted, namely in the receive buffer arrangement EP. When the buffer arrangement EP recognizes the appearance of a block end identifier and sender address, it emits a control signal to the acknowledgement register Reg2 via the line TL, this acknowledgement register Reg2 subsequently accepting the acknowledgement signal QS transmitted following the sender address, from the line arrangement ED via the data selector DW1. In response to the acceptance of such an acknowledgement signal, the acknowledgement register Reg2 emits an interrupt signal to the microprocessor MP via the line INTn. On the basis of this signal, this then accepts the acknowledgement signal ready in the acknowledgement register for an interpretation. The transmit event is thus ended.

The case wherein a signal block is to be transmitted to a group of control devices shall now also be considered. For this, too, a signal block is first compiled in the control device emitting the signal block, in the format shown in FIG. 5a and is emitted to the ring conductor arrangement. One difference is that a group of control devices is now identified by the receiver address EADR. A group can optionally comprise all control devices belonging to the ring conductor arrangement or can comprise only a part of these control devices.

With the emission of the signal block to the ring conductor arrangement, the microcompressor MP of the emitting control device also emits a multi-address signal BC to the receive buffer arrangement EP via the line also referenced BC. This multi-address signal indicates that a signal block has been emitted to a group of control devices.

The transmission of the signal block again ensues from control device to control device in the way described above. Control devices not identified by the receiver address forward the received signal block unmodified. The first control device belonging to the group identified by the receiver address, by contrast, copies the received signal block is in its receive buffer arrangement EP. Without the previous block end identifier E, the signal block is forwarded to the control device following in the ring conductor arrangement. In this forwarding and in response to a control signal emitted by the receive buffer arrangement, this control signal being transmitted via the line QK, the status register ZReg attaches another acknowledgement information segment to the sender address SADR together with a block end identifier as a new last entry. The acknowledgement information segment is composed of the address EADR1 assigned to the receiving control device within the ring conductor arrangement and of the actual acknowledgement signal QS1 relating to the reception of the signal block. The signal block emitted by the first control device belonging to the group is shown in FIG. 5c. For the above attachment of the acknowledgement information segment and of the block end identifier the data selector DW2 shown in FIG. 2 is appropriately driven via the line SL1 proceeding from the status register ZReg.

The received signal block is also copied in the further control devices belonging to the group and, without the previous block end identifier, is forwarded to the control device following in the loop system. An acknowledgement information segment and a block end identifier are again respectively attached to the last acknowledgement information transmitted in the signal block. The signal block emitted by the $m^{th}$ control device belonging to the group is shown in FIG. 5d. The signal block which the last control device belonging to the group emits includes acknowledgement information for all control devices belonging to the group.

The signal block containing the acknowledgement signals of all control devices belonging to the group is accepted into that control device from which the original signal block was emitted. This acceptance can again ensue in the form of a copying event in the receive buffer arrangement EP of that control device, to which a multi-address signal BC had been supplied with the original emission of the signal block. The copying event is initiated in response to the appearance of the block start identifier together with the multi-address signal. The signal block itself is again emitted to the ring conductor arrangement with cancellation of both the block start identifier and the block end identifier, via the output register Reg3. Since both identifiers have now been cancelled, the forwarded signal block can no longer be recognized by the control devices following in the ring conductor arrangement.

After copying the signal block including the acknowledgement information, i.e., upon appearance of the block end identifier belonging to this signal block, the receive buffer arrangement EP emits a control signal to the status register ZReg via the line QD. In response thereto, this status register ZReg offers an acknowledgement signal relating to the reception of this signal block, this acknowledgement signal being transferred via the data selector DW1 into the acknowledgement register Reg2. For this transfer, the acknowledgement register is supplied with a corresponding control signal from the receive buffer arrangement via the line TL. Moreover, the data selector DW1 is appropriately controlled for this acceptance by the status register ZReg via the line SL2.

Transfer of the acknowledgement signal transmitted into the acknowledgement register Reg2 and of the signal block situated in the receive buffer arrangement EP into the unit SU/TU again ensues in the way already set forth above. After this transfer, an evaluation of all accepted acknowledgement signals ensues in the unit SU/TU. Moreover, the transmit authorization signal received by the control device is forwarded to the control device following in the ring conductor arrangement.

Figure 3:
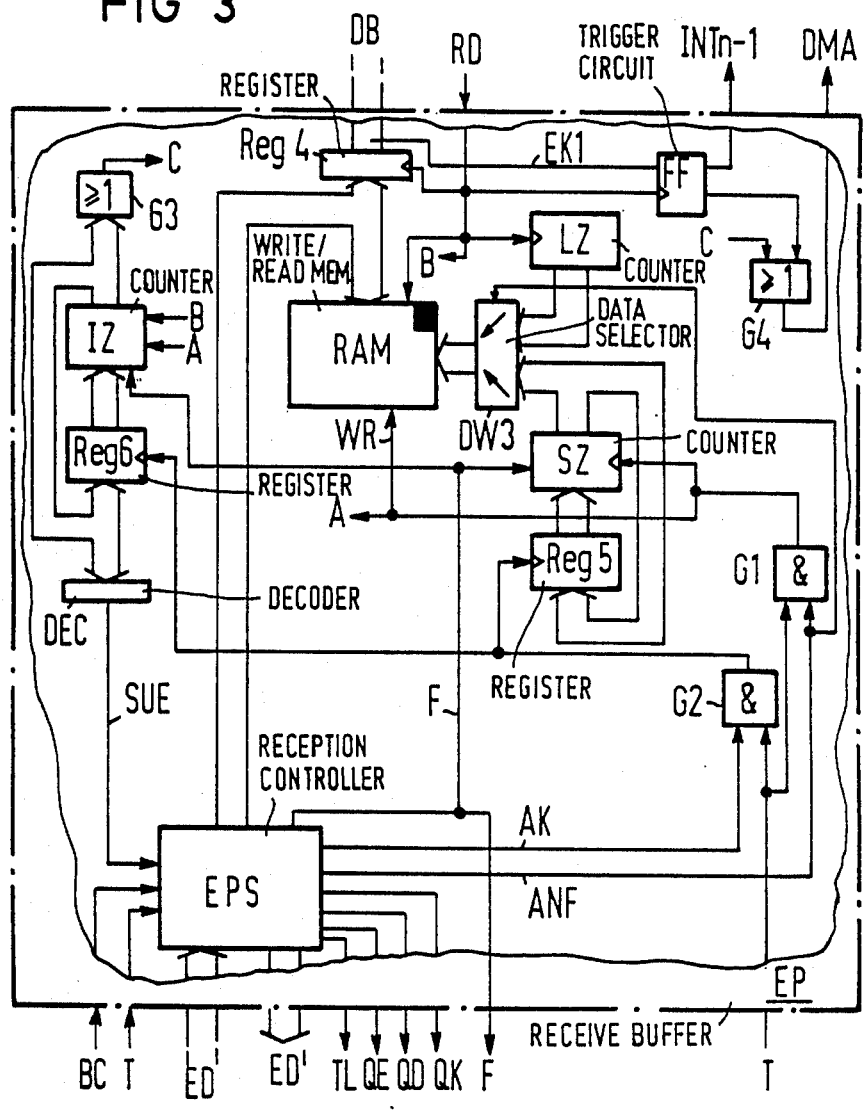
FIG. 3 shows the structure of a receive buffer arrangement present in the interface circuit of FIG. 2.

With the reference to FIGS. 3 and 4, the structure of the receive buffer arrangement referenced EP in FIG. 2 shall now be discussed in greater detail below. As shown in FIG. 3, the receive buffer arrangement contains a write/read memory RAM having a plurality of memory cells for the acceptance of signal blocks including the block end identifiers. For the acceptance of signal blocks, this memory has its data signal inputs/outputs connected to the line arrangement ED already shown in FIG. 2 and for an emission of signal blocks, has its data signal inputs/outputs connected via a register Reg4 to the data bus DB also already presented in FIG. 2. For the emission of a signal block, the register Reg4 is supplied with read-out clock signals via the line RD belonging to the control bus SB. These read-out clock signals correspond to the working speed of the respective control device.

For the acceptance of signal blocks, the write/read memory RAM, by contrast, is supplied with write-in clock signals at an input WR. These write-in clock signals appear on the line T and are emitted to the said input of the memory via an AND element G1. This AND element is driven into its conducting state by a control signal appearing on a line ANF. This control signal is emitted from a reception controller EPS.

The write/read memory has its address inputs connected to a counter LZ via a data selector DW3 and to a counter SZ. The counter SZ serving as write counter has its clock input connected to the output of the aforementioned AND element G1, i.e., it is supplied with the write clock signals simultaneously with the write/read memory RAM. Given acceptance of a signal block, the counter SZ emits its counter readings, which change based on the measure of these write-in clock signals at counter outputs for the write/read memory as address signals. These counter outputs are in communication with a register Reg5 which is supplied with a transfer clock pulse via an AND element G2. At its input side, this AND element is connected to the line T and to a line AK connected to the reception controller EPS. At its output side, the register Reg5 is in communication with setting inputs of the counter SZ. These setting inputs are enabled by a setting signal output from the reception controller EPS which appears on a line F. The counter LZ serves as read counter. Its clock input is supplied with the read-out clock signals appearing on the line RD and it emits its counter readings, which change based on the measure of these read-out clock signals to the write/read memory RAM as address signals when a signal block is read out.

The data selector DW3 connected to the two counters LZ and SZ has its control input also connected to the line ANF.

The receive buffer arrangement EP includes a further counter IZ. This counter is a bidirectional counter which, for counting in one direction, is supplied with write-in clock signals from the output of the AND element G1 and, for counting in the other direction, is supplied with read-out clock signals appearing on the line RD. At its output side, the counter IZ is connected to inputs of a decoder DEC which, given a defined counter reading of the counter IZ, emits a status signal to the reception controller EPS via a line SUE.

At its output side, the counter IZ is also connected to a register Reg6 and to an OR element G3. A clock input of the register Reg6 is supplied with a transfer clock pulse from the AND element G2. At its output side, this register Reg6 is connected to setting inputs of the counter IZ, which are again enabled by a setting signal appearing on the line F.

The output of the aforementioned OR element G3 is connected to first inputs of an OR element G4. A further input of this OR element G4 is connected to the negating output of a trigger circuit FF. The output of the OR element G4 is connected to the line DMA. The non-negating output of the trigger circuit FF is connected to the line INTn-1. The clock input of this trigger circuit FF is supplied with read-out clock signals appearing on the line RD. The data input of the trigger circuits FF is connected to the line EK of the data bus DB, which carries the block end identifier.

The reception controller EPS is in communication with a plurality of the lines indicated in FIG. 2. At the input side, these are the line arrangement ED as well as the lines BC and T. At the output side, there is a connection to the line arrangement ED' and to the lines TL, QE, QD, QK and F.

The following control events occur in sequence in the receive buffer arrangement EP shown in FIG. 3. Upon the appearance of a block start identifier together with a receiver address identifying the control device, the reception controller EPS emits a control signal via the line ANF. On the basis of the control signal, the write/read memory RAM as well as the two counters SZ and IZ are supplied with write-in pulses for the acceptance of a received signal block, via the AND element G1. Both counters will be first situated at a basic counter reading which, for example, can be assumed to be the counter reading "0". The counter reading is then modified with every write-in clock pulse, whereby the memory cells of the write/read memory RAM are continuously addressed with the changing, momentary counter reading of the counter SZ, and the momentary counter reading of the counter IZ corresponds to the momentary filling state of the write/read memory. Acceptance of signals belonging to a signal block then ensues until, with the appearance of the block end identifier belonging to the signal block, a control signal inhibiting the AND element G1 is supplied via the line ANF from the reception controller EPS, so that the further emission of write-in clock pulses is prevented. The momentary counter reading just emitted by the two counters SZ and IZ at this point in time is retained.

As was already set forth in conjunction with FIG. 2, the unit SU/TU is informed of the presence of a received signal block by a control signal transmitted via the line DMA. By supplying read-out clock signals via the line RD and continuous addressing of the memory cells of the write/read memory proceeding from the counter LZ, the signal block located in the write/read memory is subsequently transferred into the unit SU/TU by a direct memory access via the register Reg4 until the appearance of the block end identifier contained in the signal block just read out. This block end identifier appears on the line EK1 of the data bus DB. This appearance transfers the trigger circuit FF to its active condition in which it signals the end of a signal block to the microprocessor via the line INTn-1. In response thereto, the microprocessor interrupts the supply of further read-out clocks. The trigger circuit FF interrupts the control signal for a direct memory access transmitted via the line DMA.

The counter LZ will also initially begin to count proceeding from a prescribed basic counter reading, which can be assumed to be the counter reading "0". The momentary counter reading just emitted by the counter LZ given appearance of the block end identifier is then retained until the initiation of a further read-out event.

When reading a signal block out of the write/read memory RAM, the read-out clock signals are also supplied to the counter IZ. These read-out clock signals effect a counting in the reverse direction, so that the momentary counter reading of this counter is reduced with every read-out clock pulse. The momentary counter reading thus corresponds to the number of signals of the signal block which have not yet been read out of the write/read memory RAM. When the counter reading "0" which indicates the empty condition of the write/read memory is reached, the OR element G4 is inhibited so that the control signal transmitted via the line DMA is interrupted. When further signal blocks are now received, the control events already set forth occur in sequence. The only difference is that the counters SZ, LZ and IZ now continue to count from the counter readings still pending. In other words, the initial counter readings of these counters now correspond to the counter readings most recently reached upon acceptance or upon read-out of signal blocks, instead of the prescribed readings assumed earlier. The renewed write-in of signal blocks into the write/read memory RAM can already ensue at a point in time at which previously received signal blocks were not yet capable of being completely transferred into the unit SU/TU. In this case, the acceptance of a signal block just received has priority over the read-out of previously received signal blocks. In the acceptance of signal blocks the counter IZ changes its counter reading in accord with the number of memory cells of the write-read memory RAM which are occupied by signals of the signal blocks and which have not yet been read out.

Upon reception of a signal block and in response to the appearance of the block start identifier transmitted therewith, a transfer clock pulse is emitted via the AND element G2 to the two registers Reg5 and Reg6, due to a signal transmitted via the line AK. In response thereto, these registers respectively accept the momentary counter reading emitted by the counter respectively connected thereto as an initial counter reading for a further acceptance of signal blocks.

When, due to the acceptance of signal blocks into the write/read memory RAM and at transfer into the unit SU/TU which has not yet ensued, a prescribed counter reading which indicates the maximum filling state of the write/read memory RAM is reached, then a status signal to the reception controller EPS is emitted proceeding from the decoder DEC, this reception controller EPS subsequently transmitting a setting signal via the line F for enabling the setting inputs of the counters SZ and IZ. The initial counter readings transferred into the registers Reg5 and Reg6 at the beginning of the signal block just received are thus transferred into the counters SZ and IZ, i.e., the memory cells of the write/read memory RAM which have already been occupied by signals of the signal block which cannot be completely accepted are again released. Acceptance of the signal block just received into the write/read memory RAM is ended. This ensures by inhibiting the AND element G1 by a control signal transmitted via the line ANF. The incomplete acceptance of a signal block is also signaled to the status register ZReg via the line F shown in FIG. 2. The status register ZReg subsequently attaches a corresponding acknowledgement signal to the sender address transmitted with the signal block just received.

Figure 4:
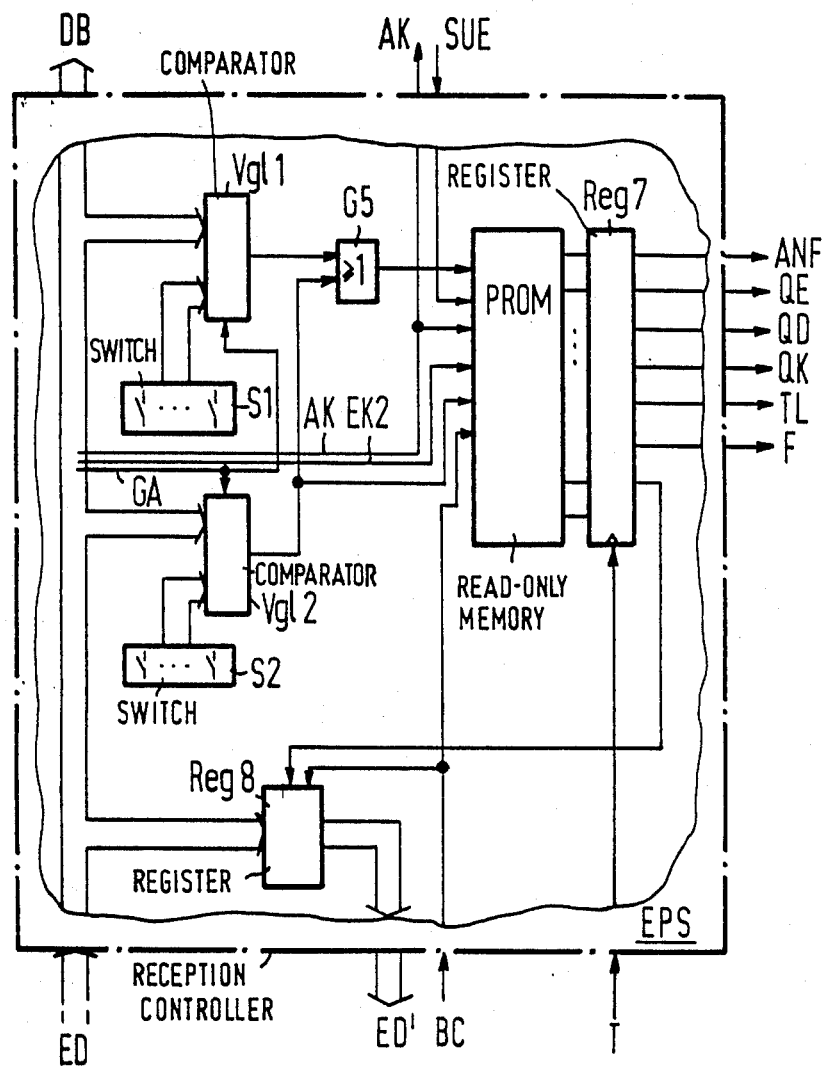
FIG. 4 shows the structure of a reception controller pertaining to the receiver buffer arrangement of FIG. 3.

FIG. 4 shows the structure of the reception controller EPS. This contains two comparator arrangements Vg11 and VG12 for comparison of the receiver address transmitted together with the block start identifier or of the sender address transmitted together with an acknowledgement signal, to an address assigned to the appertaining control device within the ring conductor arrangement. The comparator arrangement Vg11 thereby serves for an address comparison given reception of a signal block intended for only one of the control devices and given reception of an acknowledgement signal. The comparator arrangement Vg12 serves for an address comparison given reception of a signal block intended for a group of control devices. The comparison address to be consulted for the respective comparison is supplied by an arrangement S1 or S2 each shown as a switch arrangement which is connected to the respective comparator arrangement Vg11 or Vg12. These arrangements can thereby be arbitrary storage devices. The comparator arrangement to be respectively employed for an address comparison is controlled by a signal on the line GA. This signal is a component part of the receiver address indicating a group of control devices and identifies this as such.

The outputs of the two comparator arrangements Vg11 and Vg12 are connected via an OR element G5 to one of the address inputs of a read-only memory PROM. Further address inputs of this memory are in communication with a line AK carrying the block start identifier, with a line EK2 carrying the block end identifier, with the lines SUE, BC and with the output of the comparator arrangement Vg12. The two lines AK and EK2 belong to the line arrangement ED.

The read-only memory PROM includes a plurality of storage locations in which all control signals for handling the received signal blocks and acknowledgement signals are stored. This read-only memory PROM has its data outputs connected to a register Reg7. Via data outputs, this register is in communication with the lines ANF, QE, QD, QK, TL and F already shown in FIG. 2. A data output is also additionally connected to a first control input of a register Reg8. One clock input of the register Reg7 is also connected to the line T.

A second control input of the Register Reg8 is connected to the line BC already shown in FIG. 2. At its input side, this register is in communication with the line arrangement ED and, at its output side, is in communication with the line arrangement ED'.

Dependent on the signals which are supplied at the moment to the read-only memory PROM at its address inputs, it emits a control signal corresponding to these signals which is accepted by the register Reg7 and is forwarded to the line coming into consideration. The effect of the control signals appearing on the lines ANF, QE, QD, QK, TL and F has already been set forth with reference to FIG. 2.

Via the register Reg8, each of the signal blocks received by the control device is forwarded to the control device following in the ring conductor arrangement. In this forwarding, a modification of the signal block may ensue with respect to the block start identifier and block end identifier contained therein. As already set forth above, the possible modification is, dependent on the type of signal block now to be forwarded, cancellation of the block start identifier, of the block end identifier or of both identifiers.

Although modifications and changes may be suggested by those skilled in the art it is the intention of the inventor to embody within the patent warranted hereon all changes and modifications as reasonably and properly come within the scope of their contribution to the art.

We claim as our invention:

1. A method for transmitting data between two control devices in a system having a plurality of control devices connected by at least one clock controlled transmission loop operated directionally dependent, said method comprising the steps of:
   generating a signal block in a sending control device for transmission to another of said plurality of control devices intended as a receiving control device;
   generating a first entry preceding said data signals in said sending control device having a receiver address identifying said intended receiving control device;
   generating a last entry following said data signal in said sending control device having a sender address identifying the sending control device and a block end identifier;
   emitting said first entry, said data signals, and said last entry as a signal block to said loop for transmission around said loop to all other control devices;
   a control device having an address corresponding to said receiver address, in response to the appearance of the block start identifier and said receiver address in said signal block, copying said signal block therein for possible processing by said receiving control device;
   cancelling said block start identifier from said block signal in said receiving control device;

attaching an acknowledgement signal to said sender address identified by the block end identifier in said receiving control device;

re-emitting said signal block with the acknowledgement signal and the block start identifier cancelled to said loop system;

inhibiting copying of a signal block not having a block start identifier in all control devices; and said sending control device, upon recognition of its sender address in combination with said block end identifier, accepting said acknowledgement signal for interpretation.

2. A data transmission system having a plurality of control devices connected by at least one clock-controlled transmission loop operated directional dependent, each control device including:

means for generating data signals for transmission to another control device around said loop from said control device to control device;

means for generating a first entry preceding said data signals having a receiver address identifying another control device in said plurality of control devices intended to receive said data signals and a block start identifier;

means for generating a last entry following said data signals identifying the control device emitting said data signals and a block end identifier;

means for emitting said first entry, said data signals, and said last entry as a signal block to said loop for transmission around said loop to all other control devices;

means, upon receipt of said signal block, if the receiving control device is the control device identified by said receiver address, for copying said signal block for possible processing by the receiving control device;

means in the receiving control device for cancelling the block start identifier of said signal block;

means in the receiving control device for attaching an acknowledgement signal to said sender address;

means for re-emitting said signal block with the acknowledgement signal attached thereto and the block start identifier cancelled to said transmission loop for transmission around said loop;

means in all control devices for inhibiting copying of a signal block not having a block start identifier; and means for accepting the said acknowledgement signal in the control device which originally transmitted said signal block upon recognition of said sender address in combination with said block end identifier for interpreting said acknowledgment signal.

3. A system as claimed in claim 2, wherein said means for copying said signal block comprises:

a write/read memory having a plurality of memory cells for accepting at least one signal block including the block end identifier;

a first counter means connected to said write/read memory for continuously addressing said memory cells during acceptance of a received signal block proceeding from a prescribed initial counter reading, the count of said first counter means changing with each pulse of a write in clock signal corresponding to the transmission rate of said clock-controlled transmission loop, said first counter means ceasing counting upon the appearance of said block end identifier;

a second counter means connected to said write/read memory for enabling read-out of the signal block stored in the memory cells of said write/read memory, said second counter means counting from a prescribed initial counter reading and changing count with each pulse of a read-out clock corresponding to the operating speed of the control device containing said write/read memory, said second counter means ceasing counting upon the appearance of said block end identifier in said signal block.

4. A system as claimed in claim 3, wherein said memory cells of said write/read memory are addressable by said first and second counter means in circulating fashion and wherein the respective initial counts of said first and second counter means are identical, said initial count, before the acceptance or read-out of any signals in said write/read memory being a selected count, and after acceptance or read-out of a signal block, said prescribed counts being the counter reading existing upon the appearance of said block end identifier in each counting means.

5. A system as claimed in claim 4, wherein said means for copying further comprises:

a third counter means capable of bidirectional counting connected to said write-in clock and to said read-out clock, said third counter means, proceeding from an initial counter reading, changing its count in one counting direction with each appearance of a pulse from said write-in clock and changing its count in the other counting direction with each pulse of said read-out clock, said third counter means indicating a maximum input state of said write/read memory when a selected final counter reading is reached, said third counter means supplying said status signal to said first counter means which thereupon assumes its initial counter reading before acceptance of the current signal block, and said third counter means changing its count to correspond to the input state of the write/read memory before beginning acceptance of the current signal block.

6. A system claimed in claim 5, wherein said first and third counter means each include a register into which, upon the appearance of a block starter identifier, the current counter reading of each counter means is entered and which, upon the occurrence of a status signal indicating the maximum input state of the write/read memory, transmitts the counter reading therein for use as the respective initial counter reading for each of the first and third counter means.

7. A system as claimed in claim 2, wherein each control device further comprises:

a comparator for comparing said receiver address with an address for the control device receiving the signal block a memory having a plurality of storage cells connected to said comparator, said storage cells containing all control signals for processing said signal block;

means for informing said memory of the appearance of the block start identifier for said signal block;

means for informing said memory of the block end identifier for said signal block, said block start identifier and said block end identifier being used by said memory as address signals; and means for initiating selected processing of said signal block based on the addressed cells of said memory.

* * * * *